Figures 1, 2:
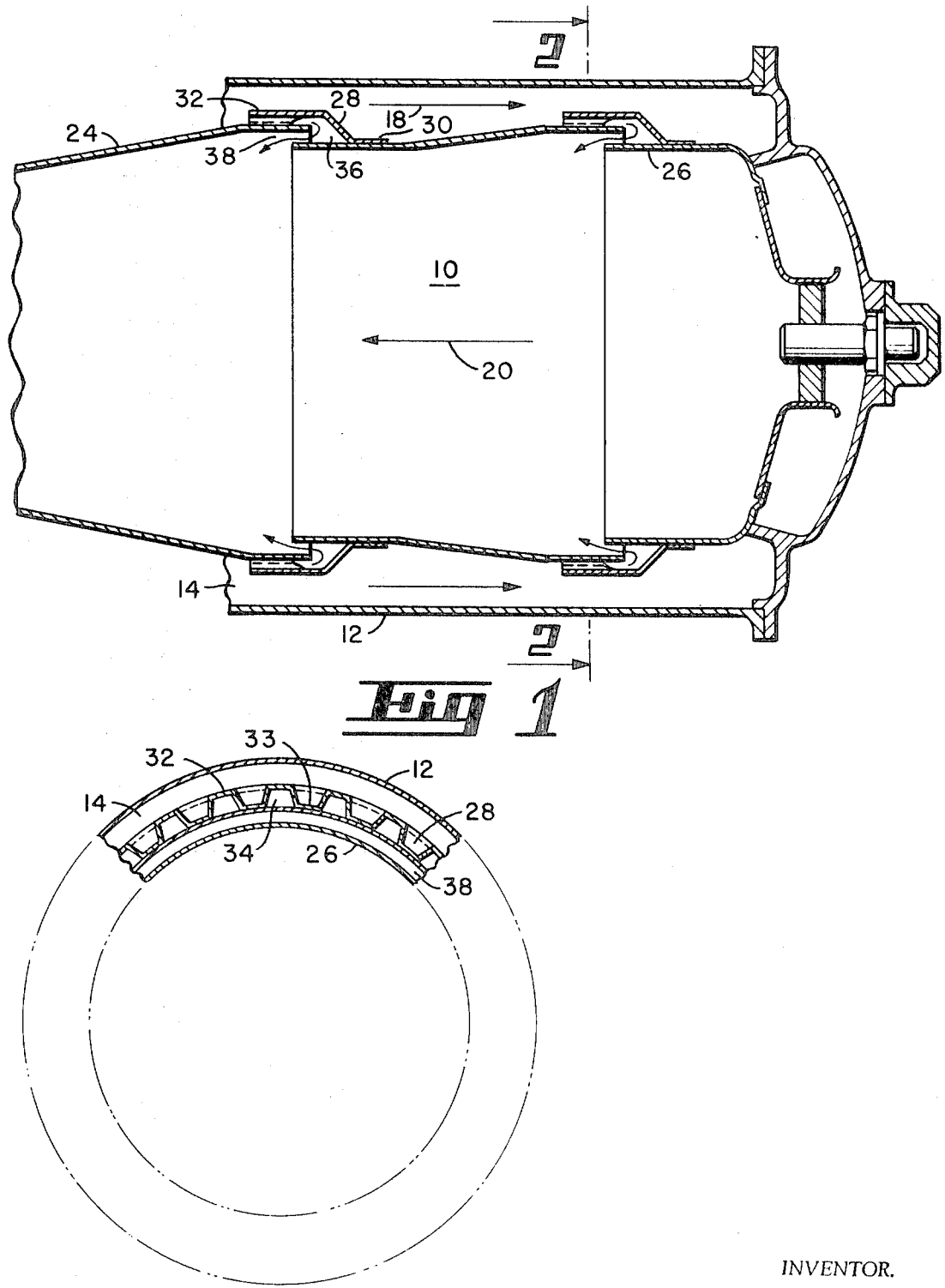

United States Patent

[11] 3,589,128

| [72] | Inventor | Ervin J. Sweet |
| | | Trumbull, Conn. |
| [21] | Appl. No. | 7,856 |
| [22] | Filed | Feb. 2, 1970 |
| [45] | Patented | June 29, 1971 |
| [73] | Assignee | Avco Corp. |
| | | Stratford, Conn. |

[54] COOLING ARRANGEMENT FOR A REVERSE FLOW GAS TURBINE COMBUSTOR
3 Claims, 2 Drawing Figs.

[52] U.S. Cl. ................................................ 60/39.65, 431/352
[51] Int. Cl. .................................................. F02c 3/00
[50] Field of Search ...................................... 60/39.65, 39.69, 39.36, 39.37; 431/352

[56] References Cited
UNITED STATES PATENTS

| 2,952,126 | 9/1960 | Denise | 60/39.74 |
| 3,019,606 | 2/1962 | Franz | 60/39.65 |
| 3,064,425 | 11/1962 | Hayes | 60/39.65 |
| 3,352,106 | 11/1967 | Pianko | 60/39.65 |

*Primary Examiner*—Douglas Hart
*Attorneys*—Charles M. Hogan and Irwin P. Garfinkle ABSTRACT: The compressed airflow for the compressor of a gas turbine engine is initially contra to the direction of flow of the combustion gases and is scooped and turned before entering the combustion chamber. The combustion chamber liner is comprised of telescoping combustor sections, each downstream section overlapping an upstream section. The adjacent sections are rigidly interconnected by means of an annular joint which provides an inlet scoop for the compressed air, a mixing chamber, and an annular efflux area for discharging air into the combustion chamber. The scoop is formed by corrugations on the joint welded to the outer periphery of the downstream section. The mixing chamber and efflux area are formed by welding the other end of the joint to the outer periphery of the upstream section.

PATENTED JUN29 1971          3,589,128

INVENTOR.
ERVIN J. SWEET
BY Charles M. Hogan
ATTORNEYS.

3,589,128

COOLING ARRANGEMENT FOR A REVERSE FLOW GAS TURBINE COMBUSTOR

BACKGROUND OF THE INVENTION

This invention relates to a combustion chamber construction in which highly efficient means are provided for cooling the walls of the combustion chamber. The combustor for a gas turbine engine is often made of a number of telescoped cylindrical combustor cans, sometimes referred to as liners or flame tubes. A common method for manufacturing these combustors is to telescope a number of axially aligned sections and spotweld them together at circumferentially spaced points along their overlapping edges. The cans at the overlapping edges are provided with circumferential corrugations or dimples to provide an air inlet. It has been found that while sufficient cooling air can be admitted to the combustion chamber through such inlets, the area directly behind the spotwelds does not receive sufficient cooling air so that hot spots are developed tending to prematurely burn out the combustion can. This invention overcomes the prior art deficiency by utilizing a reverse flow combustor in which the overlapping sections are interconnected with a joint which admits air through a controlled inlet, provides a mixing and reversing chamber for the air, and provides for entry of the air into the combustion chamber through an annular efflux area.

SUMMARY OF THE INVENTION

Cooling the walls of a high temperature rise combustor is governed largely by two generally conflicting requirements. Cooling air film entry into the combustion chamber, or flame tube, should be a low velocity, thick layer, but the pressure drop requirements result in small openings which produce a thin, high-velocity film. Both of these conflicting requirements can be obtained in a reverse flow combustor by providing an inlet flow control area separate from the efflux area. To this end the spaced overlapping sections of a combustion chamber are rigidly interconnected by means of an annular sheet metal joint having a conventional dimpled or corrugated configuration at one end. The joint is spotwelded at the dimples to the outer periphery of one of the sections and the space between the dimples defines the control area for the cooling air inlet. The other end of the joint is welded to the outer periphery of the other section to provide a mixing chamber and an annular efflux area. The flow reversal in the mixing chamber evens out the streaks introduced by the corrugations, thereby providing a film of uniform thickness around the liner.

THE DRAWINGS

FIG. 1 is a cross-sectional view of the combustion section of the gas turbine engine made in accordance with this invention; and FIG. 2 is a section taken through the line 2—2 in FIG. 1.

DESCRIPTION OF THE DISCLOSED EMBODIMENT

Referring to the drawings, there is provided a sheet metal combustion chamber 10 having a generally cylindrical configuration. The entire combustion chamber is surrounded by a generally cylindrical casing 12 which in combination with the walls of the combustion chamber 10 define a cylindrical air jacket 14 into which compressed air is introduced in the direction of the arrows 18.

The combustion chamber 10 is comprised of a plurality of telescoping liner sections 22, 24 and 26, the downstream (in the direction of the combustion gases as indicated by the arrow 20) sections overlapping the upstream sections. The overlapping portions of the telescoped sections are rigidly interconnected by means of joints 28. The rigid connection is formed by welding the joint 28 to the outer periphery of the overlapping sections and is therefore located entirely within the air jacket 14. The end 30 of the joint 28 is welded to the periphery of the overlapped sections, while the end 32 is corrugated or dimpled and is spotwelded at the dimples 33 to the overlapping section. The space 34 between the corrugations provides a scoop in the compressed gas stream. The end 30 of each of the joints in combination with the overlapped section provides a mixing chamber 36 for the scooped air, while the two adjacent cylindrical portions of the telescoping sections provide an annular air efflux 38.

The joint used for connecting the telescoping sections functions efficiently for several purposes: First, it provides a very rigid connection between the telescoped sections; second, the size of the corrugation or dimples effectively provides a means for controlling the entry of air scooped into the combustion chamber; third, the chamber 36 provides a space for smoothing out the airflow caused by the corrugations or dimples in the joints; and, fourth, the uninterrupted annular efflux area 38 permits control over the film thickness entering the combustion chamber so that a uniform cooling film is provided throughout the length of the liner and hot spots are eliminated.

While the particular embodiment of the invention is shown in conjunction with a cylindrical combustion chamber, an annular combustion chamber having overlapping sections is entirely within the scope of this invention. As will be recognized by persons skilled in the art, this invention is useful in any application in which telescoping sections of various configurations must be efficiently cooled.

I claim:

1. In a combustor having axially extending upstream and downstream telescoping annular sections, said downstream section overlapping the upstream section, an annular axially extending joint surrounding the overlapping portions of said telescoped sections, said joint rigidly interconnecting said sections, the periphery of one end of said joint being bonded to the outer periphery of the upstream sections, the other end of said joint being provided with dimples bonded to the outer periphery of said downstream section, the space between said dimples providing a scoop for cooling gases flowing around the outer periphery of said combustor in a direction contra to the flow of gases in said combustor, the space between said joint and said upstream section providing a mixing chamber for said cooling gases, the space between the overlapped portions of said telescoped sections providing an uninterrupted annular efflux area for said cooling gases.

2. In a gas turbine engine having a reverse flow combustor, said combustor being supplied with compressed air flowing in a direction opposite to the flow of combustion gases in said combustor, said combustor comprising at least first and second telescoped sections, said sections being oriented in the direction of flow of said combustion gases, said first section being upstream of and overlapped by said second section, a joint rigidly interconnecting said first and second sections, said joint surrounding the overlapped portions of said telescoped sections, the periphery of one end of said joint being bonded to the outer periphery of said first section, the other end of said joint being corrugated, the valleys of said corrugations being bonded to the outer periphery of said second section, the space between said corrugations providing a scoop for compressed air, the space between said joint and said first section providing a mixing chamber for scooped compressed air, and the space between the overlapping portions of said telescoped sections providing an uninterrupted annular efflux area for said compressed air.

3. In a gas turbine engine having a cylindrical combustor, a casing spaced from and surrounding said combustor, the space between said casing and said combustor providing a passageway for compressed air, said compressed air flowing in a direction opposite to that of the combustion gases within said combustor, said combustor comprising at least first and second telescoped sections, said first section being overlapped by said second section; a joint rigidly interconnecting said first and second sections, said joint surrounding the overlapped portions of said telescoped sections, the periphery of one end of said joint being bonded to the outer periphery of said first section, the other end of said joint being corrugated, the valleys of said corrugations being bonded to the outer periphery of said second section, the space between said corrugations providing a scoop in said passageway for scooping compressed air into said combustor, the space between said joint and said first section providing a mixing chamber for scooped compressed air, and the space between the overlapping portions of said telescoped sections providing an uninterrupted annular efflux area for said compressed air.